(12) United States Patent
Yoshikawa et al.

(10) Patent No.: US 6,767,311 B2
(45) Date of Patent: Jul. 27, 2004

(54) VEHICLE STARTING CLUTCH CONTROL DEVICE

(75) Inventors: Haruhiko Yoshikawa, Saitama (JP); Mitsuo Kitada, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 30 days.

(21) Appl. No.: 09/986,088

(22) Filed: Nov. 7, 2001

(65) Prior Publication Data

US 2002/0055415 A1 May 9, 2002

(30) Foreign Application Priority Data

Nov. 7, 2000 (JP) ..................................... P.2000-338993

(51) Int. Cl.[7] ............................................. B60K 41/02
(52) U.S. Cl. ....................... 477/176; 477/174; 477/180
(58) Field of Search ................................ 477/174, 175, 477/176, 180

(56) References Cited

U.S. PATENT DOCUMENTS

| 5,002,170 A | * | 3/1991 | Parsons et al. ............. 477/174 |
| 5,097,724 A | * | 3/1992 | Braun ......................... 477/73 |
| 5,275,267 A | * | 1/1994 | Slicker ....................... 477/176 |
| 5,293,316 A | * | 3/1994 | Slicker ....................... 701/68 |
| 5,322,150 A | | 6/1994 | Schmidt-Brücken et al. |
| 5,630,773 A | * | 5/1997 | Slicker et al. ............... 477/176 |
| 5,738,609 A | | 4/1998 | Jones et al. |
| 5,980,428 A | * | 11/1999 | Liu ............................. 477/180 |
| 6,071,211 A | * | 6/2000 | Liu et al. ..................... 477/175 |
| 6,165,104 A | * | 12/2000 | Streib ......................... 477/174 |
| 6,364,813 B1 | * | 4/2002 | Patel et al. .................. 477/174 |

FOREIGN PATENT DOCUMENTS

| EP | 0 130 794 B2 | 8/1992 |
| EP | 0 760 442 A1 | 3/1997 |
| EP | 1 002 687 A2 | 5/2000 |
| JP | 6-67695 | 8/1994 |

OTHER PUBLICATIONS

European Search Report of Jun. 20, 2003.

* cited by examiner

Primary Examiner—Charles A Marmor
Assistant Examiner—Dennis Abdelnour
(74) Attorney, Agent, or Firm—Arent Fox PLLC (57) ABSTRACT

A starting clutch control device controls such that the transmission torque capacity of a starting clutch (clutch torque) becomes a value required to transmit a torque equal to an engine absorption torque at the time of power-off running. A control of gradually increasing a clutch torque is carried out with a delay after an accelerator pedal is depressed during power-off running, to thereby prevent the occurrence of surging vibrations when an accelerator pedal is abruptly depressed during power-off running.

3 Claims, 7 Drawing Sheets

VEHICLE STARTING CLUTCH CONTROL DEVICE

BACKGROUND OF THE INVENTION

1. Field of the Invention

The present invention relates to a vehicle starting clutch control device in which the transmission torque capacity of a starting clutch can arbitrarily be controlled by an actuator.

2. Description of the Related Art

Conventionally, disclosed as a control device of this type in JP-B-6-67695 is a vehicle starting clutch control device for controlling an actuator so that the transmission torque capacity of a starting clutch becomes a value required to transmit a torque equal to an engine absorption torque corresponding to the then engine speed at the time of power-off running where the accelerator pedal is not substantially depressed. According to this control device, being different from a control device in which the starting clutch is kept in a complete engaged condition at the time of power-off running as well as power-on running, the starting clutch can be momentarily disengaged so as to prevent the engine stall when the brakes are applied abruptly.

With the aforesaid conventional control device, when the accelerator pedal is depressed abruptly during power-off running the transmission torque capacity of the starting clutch is controlled to gradually increase in order to shift the starting clutch to a completely engaged condition. However, the output torque of the engine does not build up as soon as the accelerator pedal is depressed, and the transmission torque capacity of the starting clutch has increased to some extent during this delay of response. Then, in a case where the above conventional art is applied to the control of a starting clutch for a normal manual transmission which comprises a mechanical friction clutch, drive torque for the drive wheels builds up abruptly through transmission of torque via the starting clutch when the output of the engine builds up, whereby there may be a risk that surging vibrations (longitudinal vibrations) are generated in the body of the vehicle.

SUMMARY OF THE INVENTION

The present invention was made in view of the above situation, and an object thereof is to provide a vehicle starting clutch control device which can prevent the generation of surging vibrations when the accelerator pedal is abruptly depressed during power-off running.

With a view to attaining the object, according to the invention, there is provided a vehicle starting clutch control device for arbitrarily controlling a transmission torque capacity of a starting clutch through an actuator, said vehicle starting clutch control device comprising:

first control means for controlling said actuator so that said starting clutch is put in a state in which said starting clutch completely transmits the output torque of an engine at the time of power-on running with an accelerator pedal being depressed;

second control means for controlling said actuator so that the transmission torque capacity of said starting clutch becomes a value required to transmit a torque equal to an engine absorption torque corresponding to the engine speed at the time of power-off running without said accelerator pedal being depressed;

third control means for controlling said actuator so that the transmission torque capacity of said starting clutch gradually increases to shift said starting clutch to a state in which said starting clutch completely transmits the output torque of said engine when said accelerator pedal is depressed during power-off running; and delay means for delaying the start of control based on said third control means until a predetermined time after said accelerator pedal is depressed.

According to the aspect of the invention, the time when the third control means starts to control to gradually increase the transmission torque capacity of the starting clutch is delayed from the timing when the accelerator pedal is depressed. Therefore, even if there is a delay in building up of the output torque of the engine, the transmission torque capacity of the starting clutch has not increased as high as the conventional art when the output torque of the engine actually builds up, and there is produced a slippage in the starting clutch. Thereafter, as the transmission torque capacity of the starting clutch increases, of the output torque of the engine, the ratio of output torque which is to be transmitted to the drive wheels via the starting clutch is increased. Consequently, even if the accelerator pedal is abruptly depressed during power-off running, the drive torque of the drive wheels is allowed to build up moderately, whereby the generation of surging vibrations is prevented. The predetermined time may be determined depending upon time that has elapsed since the accelerator pedal is depressed, or time may be determined as the predetermined time when a detected engine output torque exceeds the transmission torque capacity of the starting clutch.

Incidentally, the engine absorption torque is equal to a torque required to drive the engine reversely and varies depending upon the engine speed. The engine absorption torque also varies depending upon engine temperature, the adaptability of the engine, oil volume, oil type, oil level inclination and the like, and therefore it is difficult to set an accurate value. Due to this, in the conventional art, it is presumed that the transmission torque capacity of the starting clutch during power-off running is controlled to be a value which is higher by some extent than the reference value of the engine absorption torque corresponding to the engine speed, for example, a value obtained by multiplying the reference value by a relatively large safety factor, so that there is produced no slippage in the starting clutch even when the actual value of the engine absorption torque exceeds slightly the reference value. This is because when a smaller safety factor is used, the actual value of the engine absorption torque exceeds the transmission torque capacity of the starting clutch, and a slippage is likely to be generated in the starting clutch, leading to a further risk that the effect of engine braking is reduced or the durability thereof is deteriorated. Thus, a larger safety factor needs to be adopted. As a result, the transmission torque capacity of the starting clutch at the time of power-off running becomes relatively large, and the disengagement of the starting clutch is delayed when the brakes are applied abruptly, leading to a risk that the engine stalls.

To cope with this, the second control means is constructed to control the actuator by setting as a control target value a control amount of the actuator in which the transmission torque capacity of the starting clutch becomes equal to a set value for the engine absorption torque which is a value obtained by multiplying a reference value of the engine absorption torque corresponding to the engine speed by a predetermined safety factor, detecting the specific slippage of the starting clutch and feedback correcting the control target value such that the specific slippage becomes equal to or less than a predetermined value. According to this construction, even if a relatively small safety factor is adopted, there should be produced no excessive slippage which is not good to the starting clutch. As a result, the transmission torque capacity of the starting clutch at the time of power-off running can be suppressed to a required minimum of limit, whereby the drawback inherent in the conventional art can be prevented.

Incidentally, while it is considered that the transmission torque capacity of the starting clutch is maintained to a value just before the accelerator pedal is depressed until the control by the third control means is started, in order to ensure that the occurrence of surging vibrations is prevented, the transmission torque capacity when the third control means starts to control should be made as low as possible. To cope with this, the delay means is preferably constructed to start the control by the third control means after the transmission torque capacity of the starting clutch is maintained to a value corresponding to the engine absorption torque resulting when the engine speed is around 1000 rpm for a predetermined time after the accelerator pedal is depressed.

Note that in an embodiment of the invention which will be described later, step S2 shown in FIG. 4 corresponds to the first control means, steps S4 to S6, S11 and S12 in FIG. 4 to the second control means, and steps S18, S19 in FIG. 4 to the third control means, and steps S14 to S17 in FIG. 4 to the delay means.

DETAILED DESCRIPTION OF THE PREFERRED EMBODIMENTS

Figure 1:
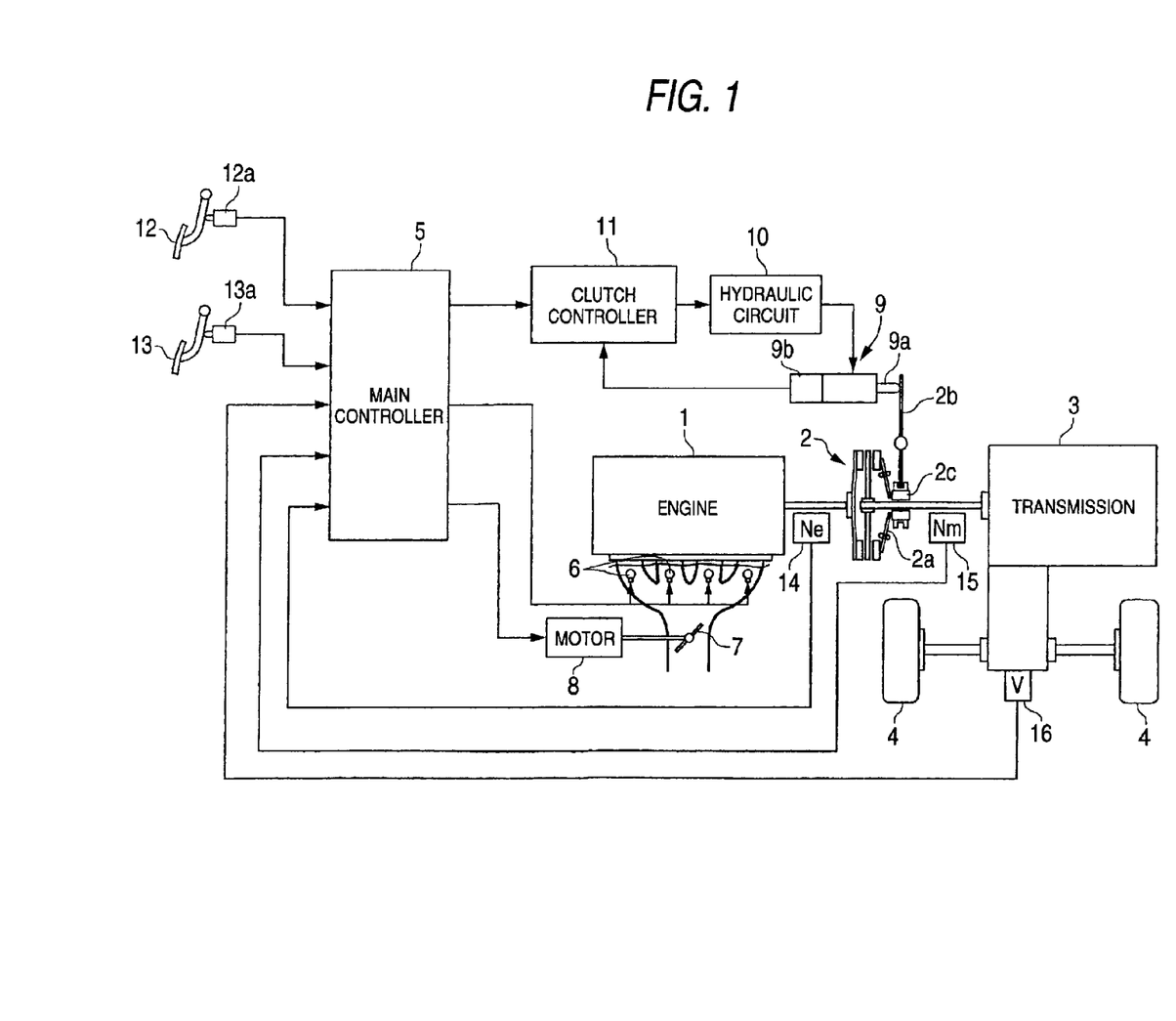
FIG. 1 is a block diagram of an embodiment of the invention.

Referring to FIG. 1, reference numeral 1 denotes an engine, and power from the engine 1 is transmitted to drive wheels 4 of a vehicle via a starting clutch 2 and a transmission 3. Fuel injection valves 6 adapted to be controlled by a main controller 5 are provided in the engine 1. In addition, the opening of a throttle valve 7 of the engine 1 is controlled by the main controller 5 via a motor 8.

Figure 2:
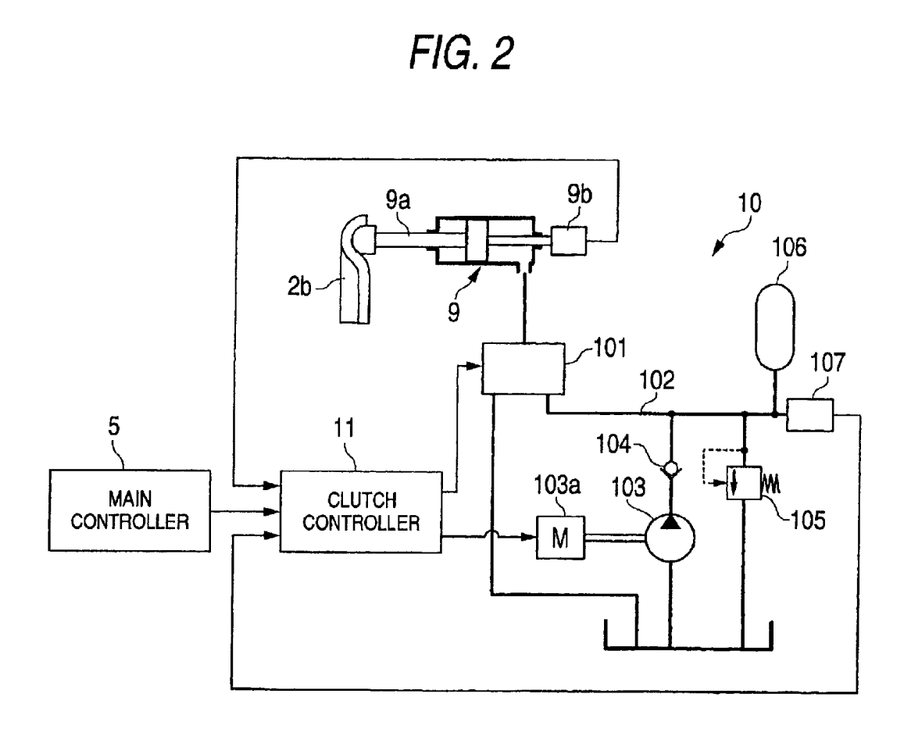
FIG. 2 is a diagram showing a hydraulic circuit for an actuator of a starting clutch.

A mechanical friction clutch for use on a vehicle with a clutch pedal is used for the starting clutch 2, which is normally engaged by virtue of the biasing force of a diaphragm spring 2a, whereas it is disengaged by a release fork 2b via a release bearing 2c, when the diaphragm spring 2a is pressed in. Then, a piston rod 9a of a hydraulic cylinder 9 serving as an actuator is brought into abutment with the release fork 2b so as to operate the release fork 2b by the hydraulic cylinder 9, to thereby control the transmission torque capacity of the starting clutch 2. As shown in FIG. 2, a hydraulic circuit 10 of the hydraulic cylinder 9 includes an electromagnetic control valve 101 which is controlled by a clutch controller 11. The clutch controller 11 is adapted to control the supply and discharge of hydraulic oil to and from the hydraulic cylinder 9. Oil discharged from an electric pump 103 is supplied to an oil supply path 102 communicating a control valve 101 via a check valve 104. The electric pump 103 has, as a driving source, a motor 103a which is controlled by the clutch controller 11. Connected to the oil supply path 102 are a relief valve 105, an accumulator 106 and an oil pressure sensor 107, whereby signals from the oil pressure sensor 107 are inputted into the clutch controller 11. And, in case the oil pressure in the oil supply 102 detected by the oil pressure sensor 107 decreases below a predetermined line pressure, the electric pump 103 is driven until the oil pressure in the oil supply path 102 reaches the predetermined line pressure.

Figure 3:
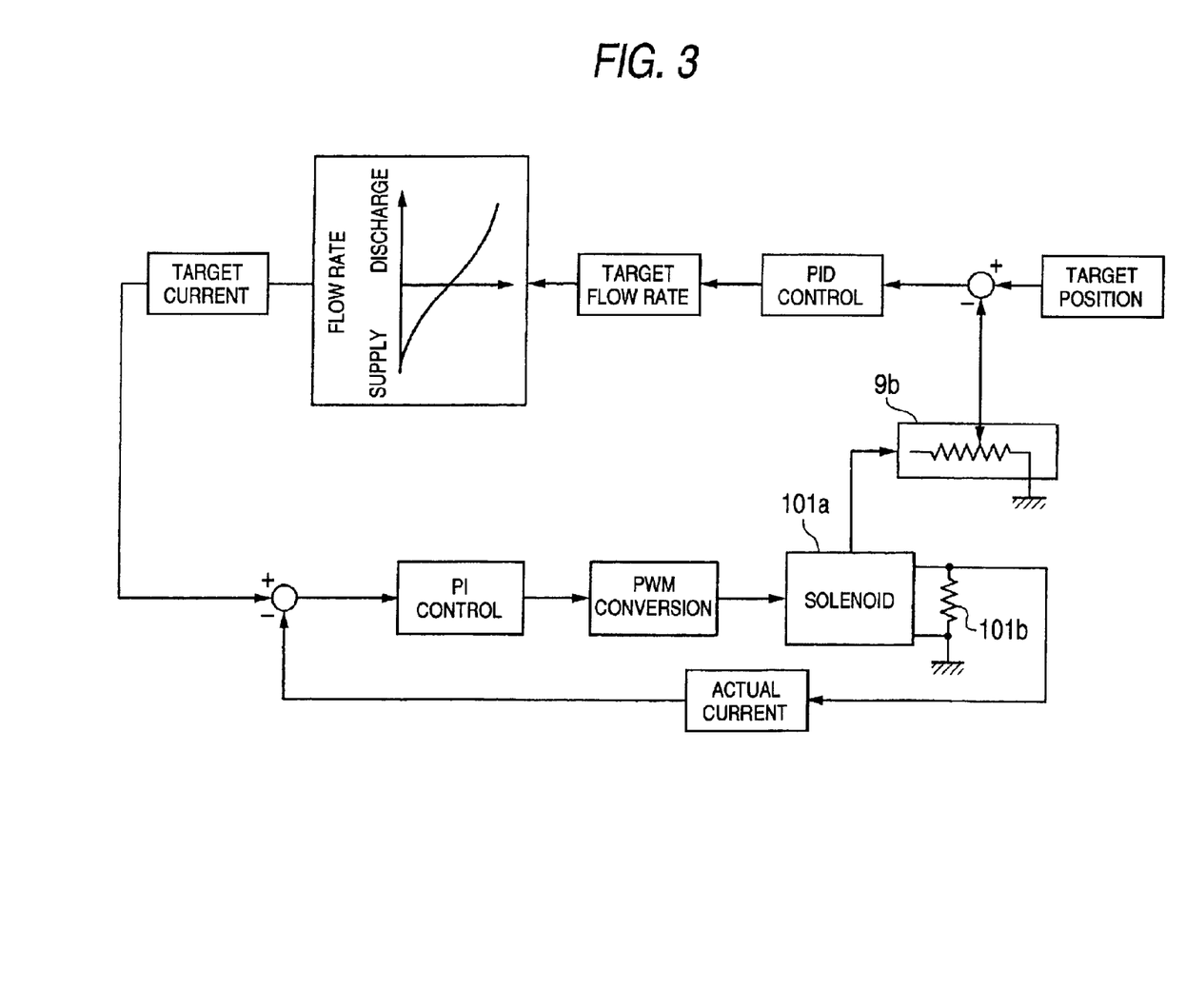
FIG. 3 is a block diagram showing the contents of control of a clutch controller.

A position sensor 9b is attached to the hydraulic cylinder 9 for detecting the stroke position of the piston rod 9a, and signals from the position sensor 9a are inputted into the clutch controller 11, whereby the control valve 101 is feedback controlled such that the stroke position of the piston rod 9a coincides with a target position that is to be calculated by the main controller 5 as will be described later for transmission to the clutch controller 11. The details thereof are as shown in FIG. 3. That is, a deviation between the target position and an actual position of the piston rod 9a detected by the position sensor 9b is obtained, and an amount of oil to be supplied to or discharged from the hydraulic cylinder 9 required to make the deviation zero is obtained through PID control. Next, A flow rate for supply or discharge of the amount of oil to be supplied or discharged per unit time is calculated as a target flow rate, and a target current value for the target flow rate is obtained from a current-flow rate properties map of the control valve 101. In addition, an actual current value that flows to a solenoid 101a of the control valve 101 is detected through a shunt resistance 101b connected to the solenoid 101a to thereby obtain a deviation between the target current value and the actual current value. Then, a current value required to make the deviation zero is obtained through PI control, and thereafter a PWM conversion is implemented to energize the solenoid 101a.

Inputted into the main controller 5 are signals, respectively, from an accelerator sensor 12a for detecting the travel of the accelerator pedal 12 when it is depressed (hereinafter, referred to as accelerator opening θAP), a brake switch 13a for detecting the depression of a brake pedal 13, a rotation sensor 14 for detecting the rotational speed Ne of the engine, a rotation sensor 15 for detecting the rotational speed Nm of the starting clutch 2 on the output side thereof, and a vehicle speed sensor 16 for detecting the vehicle speed V. Based on signals so inputted, the main controller 5 controls the fuel injection valves 6, the throttle valve 7 and the starting clutch 2.

When the vehicle is started, the transmission torque capacity of the stating clutch 2 is controlled so as to gradually increase whereas the stating clutch 2 is controlled to be disengaged when the brake pedal 13 is depressed. In addition, while the vehicle is running, as shown in FIG. 4, it is determined whether or not the vehicle speed V is a predetermined vehicle speed YV or more (S1), and in case V≧YV, transmitted to the controller 11 is a state in which the starting clutch 2 completely transmits the engine output torque or a stroke position of the piston rod 9 where the transmission torque capacity (clutch torque) of the starting clutch 2 becomes equal to or greater than the engine output torque as a target position (S2).

In case V<YV, it is determined whether or not the accelerator opening θAC is equal to or greater than a predetermined opening Yθ where the accelerator opening θAC is set at a very low opening which is close to a totally closed condition (S3). In case θAC<Yθ, namely, at the time of power-off running where the accelerator pedal 12 is substantially not depressed, a reference value for the engine absorption torque is obtained which corresponds to the engine speed Ne at that moment (S4). The engine absorption torque is a torque required to drive the engine 1 reversely, and a reference value for the engine absorption torque corresponding to Ne is retrieved from a map representing the relationship between a Ne measured in advance through a bench measurement and the engine absorption torque.

Figure 5:
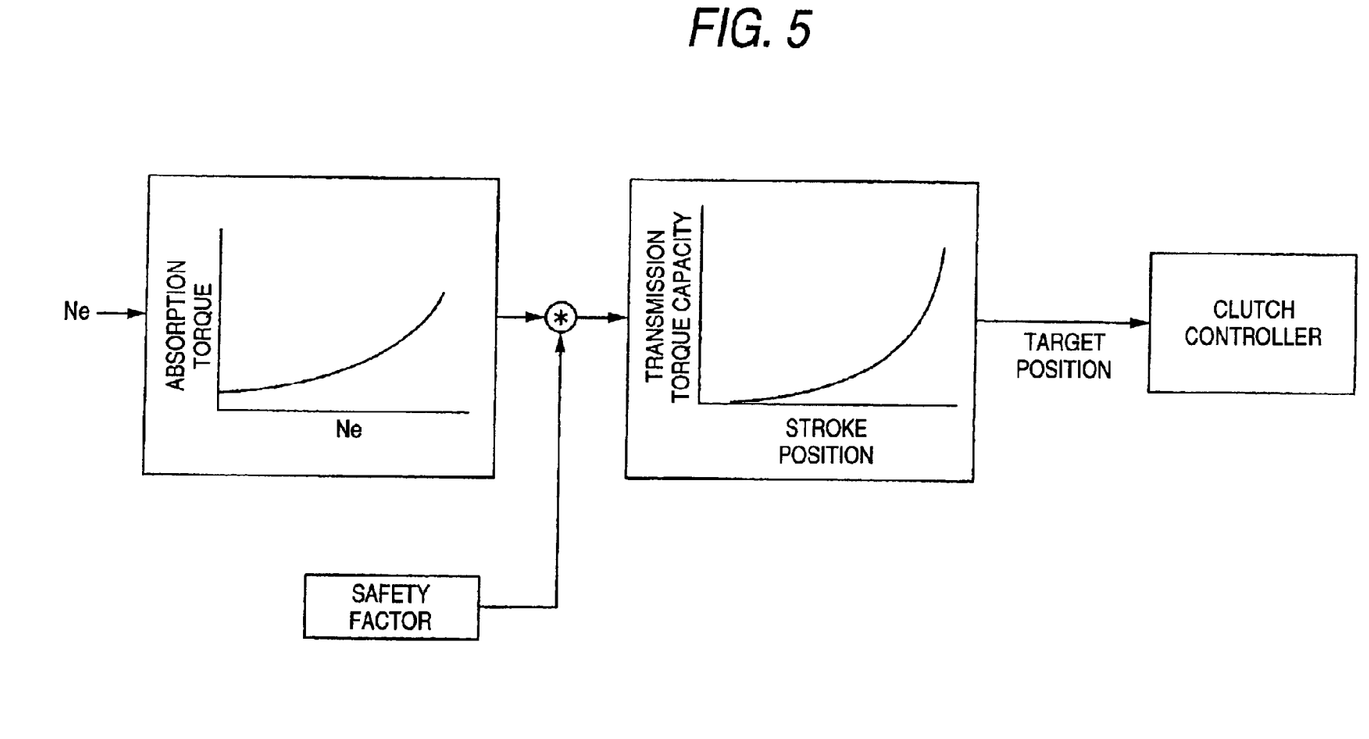
FIG. 5 is a block diagram showing the contents of processes in steps S4 to S6 in FIG. 4.

Next, this reference value is multiplied by a predetermined safety factor (for example, 1.2), and a value so obtained is set as the engine absorption torque (S5). Then, a stroke position of the piston rod 9a corresponding to a set value for the engine absorption torque is retrieved as an absorption torque position from a map showing a relationship between the transmission torque capacity of the starting clutch 2 and the stroke position of the piston rod 9a (S6). FIG. 5 shows the process from S4 to S6 using a block diagram.

Next, it is determined whether or not a first flag 1 is set at [1] (S7). The first flag 1 has been reset at [0] as will be described later at the time of power-on running where the accelerator pedal 12 is depressed. Therefore, at the initial stage of θAC<Yθ due to the release of the accelerator pedal, it is determined as [NO] in step S7. In this case, since a ramp control is implemented in which the piston rod 9a is gradually displaced from a position where the clutch torque is equal to or greater than the engine output torque to the absorption torque position obtained in step S6, a ramp control position is calculated in which the piston rod 9a gradually changes its position from the position where the clutch torque becomes equal to or greater than the engine output torque to the absorption torque position (S8), and this ramp control position is transmitted to the clutch controller 11 as a target position (S9).

Figure 6:
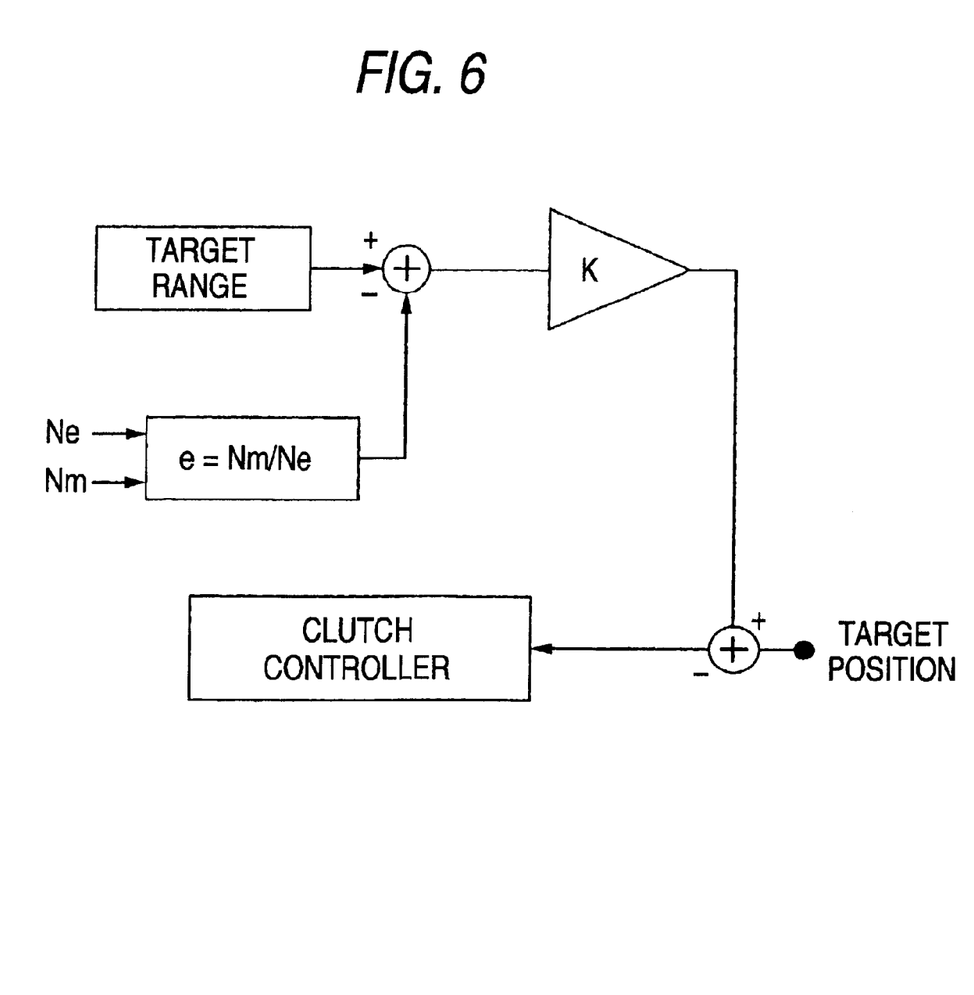
FIG. 6 is a block diagram showing the contents of a process in step S12 in FIG. 4.

Then, the first flag F1 is set at [1] after the ramp control has been completed and a second flag F2 is reset at [0] (S10). Thus, after the ramp control has been completed it is determined as [YES] in step S7, and then, the absorption torque position obtained in step S6 is transmitted to the clutch controller 11 as the target position (S11). Next, the speed ratio e=Nm/Ne of the starting clutch 2 is calculated as a value representing the slippage ratio of the starting clutch 2 from detected values of Ne, Nm, and a feedback correction based on the speed ratio e is carried out (S12). The details of the feedback correction is as shown in FIG. 6, and when the detected speed ratio e deviates from the target range of the speed ratio e, for example, 0≦e≦1.04, a correction amount for the stroke position of the piston rod 9a corresponding to the deviation of the speed ratio is obtained through a gain conversion or map retrieval, whereby the target position is feedback corrected by adding this correction amount to the target position. According to this configuration, even if a slippage occurs in the starting clutch 2 when the actual value of the engine absorption torque exceeds the set value, the slippage is restrained through the feedback correction, whereby a decrease in engine braking effect of the starting clutch 2 or a drawback with respect to the durability can be avoided as much as possible. This makes it possible to set small the safety factor used when obtaining a set value for the engine absorption torque, and it is ensured that the occurrence of engine stall due to the delay in disengagement of the starting clutch 2 when the brakes are abruptly applied is prevented by suppressing the transmission torque capacity of the starting clutch 2 at the time of power-off running to a required minimum of limit.

In case it is determined in step S3 as θAC≧Yθ, firstly, it is determined whether or not the second flag is set at [1] (s13). The second flag F2 has been reset to [0] in step S10 during power-off running. Due to this, it is determined as [NO] in step S13 when accelerator pedal 12 is initially depressed during power-off running. In this case, the stroke position of the piston rod 9a corresponding to the engine absorption torque when the engine speed is at around 1000 rpm where the engine speed is slightly higher than the idle speed of the engine is retrieved as a predetermined clutch holding (S14) by using a map showing a relationship between the transmission torque amount of the starting clutch 2 and the stroke position of the piston rod 9a. Then, in order to implement a ramp control in which the position of the piston rod 9a is gradually changed from a stroke position just before θAC≧Yθ to the predetermined clutch holding position, a ramp control position is calculated where the position of the piston rod 9a is gradually changed from the stroke position just before θAC≧Yθ to the predetermined clutch holding position (S15), and this ramp control position is sent as a target position to the clutch controller 11 (S16). Then, the target position that is to be transmitted to the clutch controller 11 is maintained at the predetermined clutch holding position until a certain time t has elapsed since the ramp control is completed (S17).

When the predetermined time t has elapsed, in order to carry out a ramp control in which the piston rod 9a is gradually displaced from the predetermined clutch holding position to a position where the clutch torque reaches or exceeds the engine output torque, a ramp control position is calculated where the position of the piston rod 9a is gradually changed from the predetermined clutch holding position to the position where the clutch torque reaches or exceeds the engine output torque (S18), and this ramp control position is transmitted as a target position to the clutch controller 11 (S19). Then, the first flag F1 is reset at [0] and the second flag F2 is set at [1] (S20). Thus, it is determined as [YES] in step S13 after the ramp control has been completed, and in this case, the flow proceeds to step S2, where the position where the clutch torque reaches or exceeds the engine output torque is sent to the clutch controller 11 as a target position.

Figure 4:
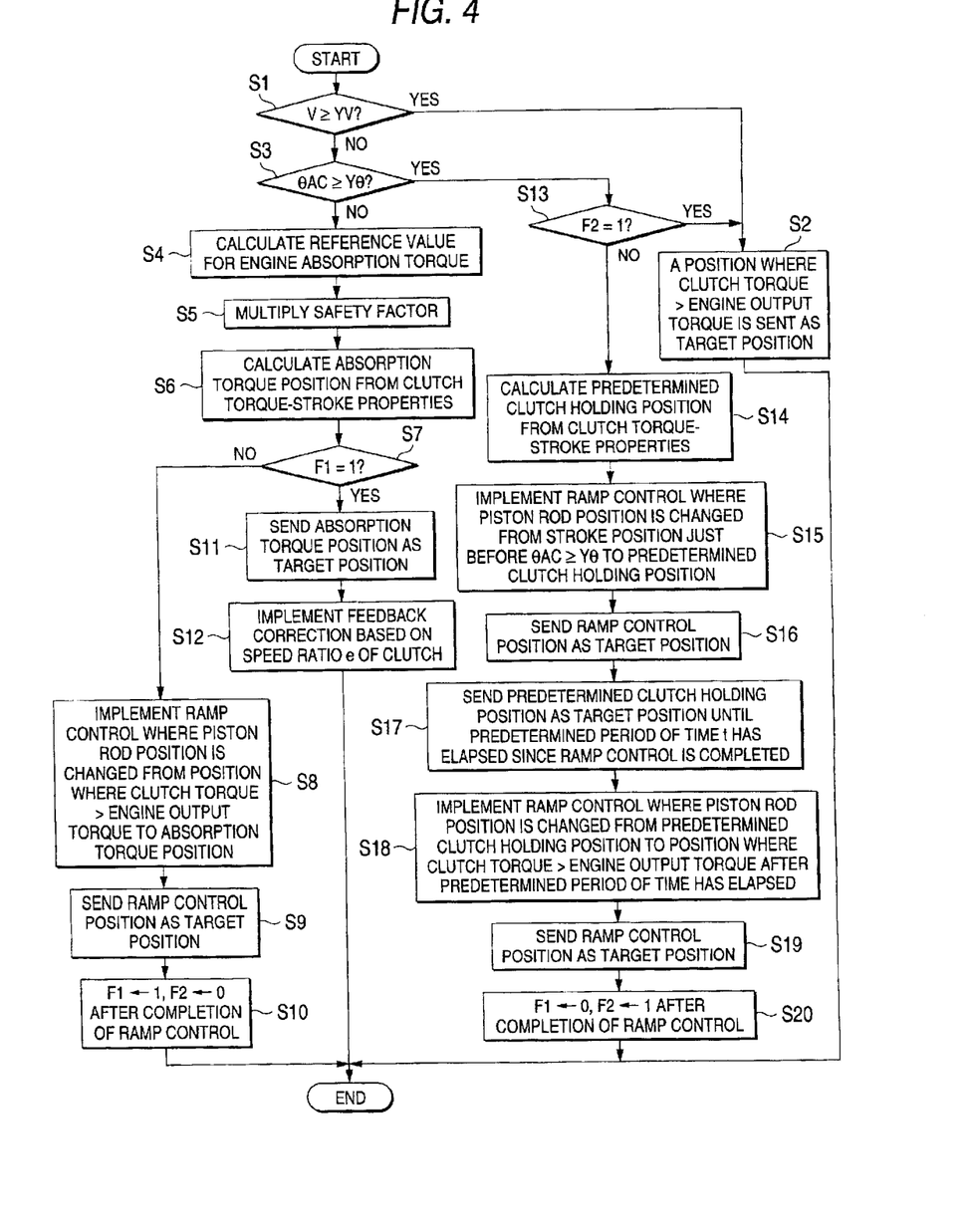
FIG. 4 is a flowchart showing the control of the starting clutch during running.
Figure 7:
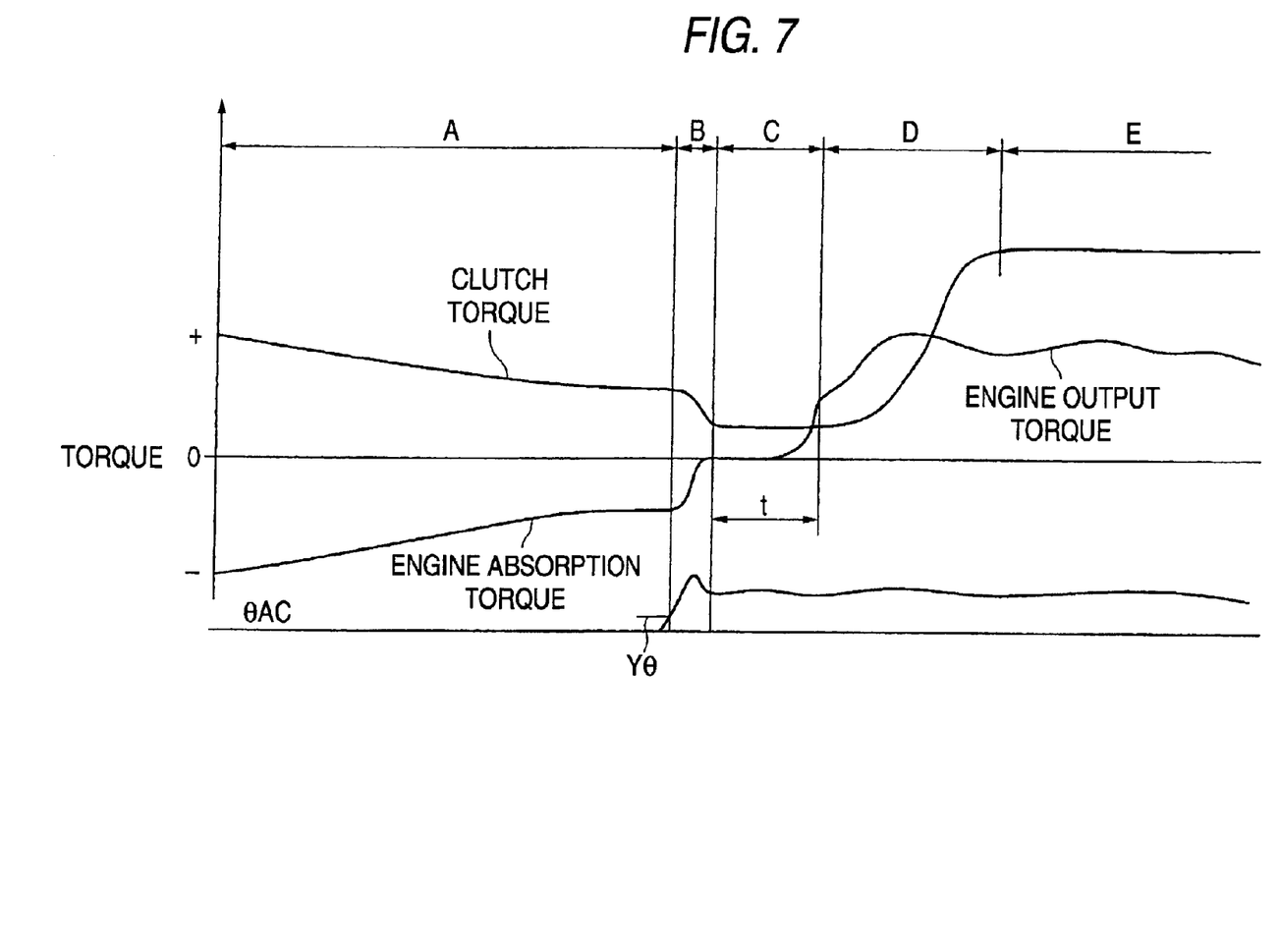
FIG. 7 is a time chart showing a change in transmission torque capacity of a starting clutch (a clutch torque) through the control shown in FIG. 4 together with changes in engine torque and accelerator opening.

FIG. 7 shows a change in transmission torque capacity (clutch torque) of the starting clutch 2 when the control shown in FIG. 4 is carried out, in the figure, an area A corresponds to the control area in steps S11, S12, an area B corresponds to the control area In steps S15, S16, an area C corresponds to the control area in step S17, an area D corresponds to the control area in steps S18, S19, and an area E corresponds to the control area in step S2. Here, the axial torque of the engine 1 becomes a negative engine absorption torque at the time of power-off running of θAC<Yθ, and then becomes 0 from the negative value to zero in the area B after the accelerator pedal 12 is depressed. However, there is a delay in response by a time when a positive torque is output from the engine 1, and in particular, in a case where the throttle valve 7 is not directly connected to the accelerator pedal 12 as with this embodiment but is controlled via the motor 8, there is caused a delay in operation of the throttle valve 7 in addition to a delay in flow of intake air. Thus, the delay in build up of the output torque of the engine 1 is quite large.

Here, in this embodiment, the control of the area D where the clutch torque gradually increases is started after the predetermined time t is maintained after the clutch torque in the areas B, C is reduced to a predetermined low torque after the accelerator pedal 12 is depressed. Accordingly, even if the building up of the output torque of the engine 1 is also delayed, since the clutch torque when the output torque builds up is still low, there occurs a slippage in the starting clutch 2, and only limited part of the output torque is transmitted to the drive wheels 4 via the transmission 3. Thereafter, as the clutch torque increases, the ratio of the torque of the output torque of the engine 1 which is transmitted to the drive wheels 4 increases. Consequently, even if the accelerator pedal 12 is depressed abruptly during power-off driving, the drive torque for the drive wheels 4 builds up moderately, whereby the occurrence of surging vibrations is prevented.

In addition, in this embodiment, the starting clutch 2 is maintained in the completely engaged condition at the time of high speed running which is faster than the predetermined vehicle speed YV even when θAC<Yθ. This is because since the inertia force of the respective revolving bodies becomes sufficiently large at the time of high speed running, there occurs no surging vibration even when the accelerator pedal 12 is abruptly depressed.

In addition, the invention is also applied to a case where the throttle valve 7 is directly operated by the accelerator pedal 12. In this case, the determining process in step S3 in FIG. 4 may be carried out based on the opening of the throttle valve 7 instead of the accelerator opening θAC.

As is clear from what has been described heretofore, according to the invention, the drive torque for the drive wheel builds up moderately even when the accelerator pedal is abruptly depressed, whereby it is ensured that the occurrence of surging vibrations is prevented.

What is claimed is:

1. A vehicle starting clutch control device for controlling a transmission torque capacity of a starting clutch through an actuator, said vehicle starting clutch control device comprising:
   first control means for controlling said actuator so that said starting clutch is put in a state that said starting clutch completely transmits the output torque of an engine at the time of power-on running with an accelerator pedal being depressed;
   second control means for controlling said actuator so that the transmission torque capacity of said starting clutch becomes a value required to transmit a torque equal to an engine absorption torque corresponding to the engine speed at the time of power-off running without said accelerator pedal being depressed;
   third control means for controlling said actuator so that the transmission torque capacity of said starting clutch is gradually increased to shift and starting clutch to the completely transmitted state when said accelerator pedal is depressed during power-off running; and
   delay means for delaying the start of control based on said third control means until a predetermined time after said accelerator pedal is depressed, wherein said second control means sets as a control target value a control amount of said actuator such that the transmission torque capacity of said starting clutch becomes equal to a set value of the engine absorption torque, said set valve of the engine absorption torque being a value obtained by multiplying a reference value of the engine absorption torque corresponding to the engine speed by a predetermined safety factor, and
   wherein said second control means controls said actuator based on the control target value while detecting a slippage ratio of said starting clutch and feedback correcting said control target value such that said slippage ratio becomes equal to or less than a predetermined value.

2. A vehicle starting clutch control device for controlling a transmission torque capacity of a starting clutch through an actuator, said vehicle starting clutch control device comprising:
   first control means for controlling said actuator so that said starting clutch is put in a state that said starting clutch completely transmits the output torque of an engine at the time of power-on running with an accelerator pedal being depressed;
   second control means for controlling said actuator so that the transmission torque capacity of said starting clutch becomes a value required to transmit a torque equal to an engine absorption torque corresponding to the engine speed at the time of power-off running without said accelerator pedal being depressed;
   third control means for controlling said actuator so that the transmission torque capacity of said starting clutch is gradually increased to shift said starting clutch to the completely transmitted state when said accelerator pedal is depressed during power-off running; and
   delay means for delaying the start of control based on said third control means until a predetermined time after said accelerator pedal is depressed, wherein said delay means starts the control of said third control means after the transmission torque capacity of said starting clutch is maintained to a value corresponding to the engine absorption torque resulting when the engine speed is substantially 1000 rpm for said predetermined time after said accelerator pedal is depressed.

3. A vehicle starting clutch control device for controlling a transmission torque capacity of a starting clutch through an actuator, said vehicle starting clutch control device comprising:
   first control means for controlling said actuator so that said starting clutch is put in a state that said starting clutch completely transmits the output torque of an engine at the time of power-on running with an accelerator pedal being depressed;
   second control means for controlling said actuator so that the transmission torque capacity of said starting clutch becomes a value required to transmit a torque equal to an engine absorption torque corresponding to the engine speed at the time of power-off running without said accelerator pedal being depressed;
   third control means for controlling said actuator so that the transmission torque capacity of said starting clutch is gradually increased to shift said starting clutch to the completely transmitted state when said accelerator pedal is depressed during power-off running; and
   delay means for delaying the start of control based on said third control means until a predetermined time after said accelerator pedal is depressed, wherein said second control means sets as a control target value a control amount of said actuator such that the transmission torque capacity of said starting clutch becomes equal to a set value of the engine absorption torque, said set value of the engine absorption torque being a value obtained by multiplying a reference value of the engine absorption torque corresponding to the engine speed by a predetermined safety factor, and
   wherein said second control means controls said actuator based on the control target value while detecting a slippage ratio of said starting clutch and feedback correcting said control target value such that said slippage ratio becomes equal or less than a predetermined value, wherein the predetermined value of said slippage ratio is set to be in the range of 1.0–1.04.

* * * * *